US007270077B2

(12) United States Patent
Beck

(10) Patent No.: US 7,270,077 B2
(45) Date of Patent: Sep. 18, 2007

(54) AVALANCHE SURVIVAL KIT

(76) Inventor: Ralph Frank Beck, 10741 Eagle Pass, El Paso, TX (US) 79924

( * ) Notice: Subject to any disclaimer, the term of this patent is extended or adjusted under 35 U.S.C. 154(b) by 0 days.

(21) Appl. No.: 11/225,657

(22) Filed: Sep. 12, 2005

(65) Prior Publication Data

US 2007/0056500 A1 Mar. 15, 2007

(51) Int. Cl.
*B64B 1/40* (2006.01)

(52) U.S. Cl. .................. 116/210; 116/209; 116/DIG. 8

(58) Field of Classification Search ........ 116/209–210, 116/DIG. 8, DIG. 9

See application file for complete search history.

(56) References Cited

U.S. PATENT DOCUMENTS

| | | | |
|---|---|---|---|
| 1,230,290 A | 6/1917 | Geiger | |
| 3,132,626 A * | 5/1964 | Reid | 116/210 |
| 3,279,419 A * | 10/1966 | Demarco | 116/210 |
| 3,362,034 A | 1/1968 | Oldham | |
| 3,746,285 A * | 7/1973 | Mango | 244/98 |
| 3,874,325 A * | 4/1975 | Cocker, III | 116/210 |
| 3,964,427 A * | 6/1976 | Murphy | 116/210 |
| 4,042,882 A * | 8/1977 | Camacho et al. | 455/98 |
| 4,052,955 A * | 10/1977 | Haushalter | 116/210 |
| 4,114,561 A | 9/1978 | Asaro | |
| 4,295,438 A | 10/1981 | Porter | |
| 4,635,754 A | 1/1987 | Aschauer et al. | |
| 5,262,768 A * | 11/1993 | Florer | 340/815.73 |
| 5,732,752 A * | 3/1998 | Glessner et al. | 141/329 |
| 6,158,380 A | 12/2000 | Aschauer et al. | |
| 6,167,249 A * | 12/2000 | Hereford et al. | 455/404.2 |
| 6,220,909 B1 | 4/2001 | Aschauer et al. | |
| 6,270,386 B1 | 8/2001 | Visocekas | |
| 6,412,482 B1 | 7/2002 | Rowe | |
| 2004/0244100 A1* | 12/2004 | Haddacks | 2/463 |

FOREIGN PATENT DOCUMENTS

| | | |
|---|---|---|
| CA | 2.255.092 | 5/1999 |
| GB | 2.081.660 | 2/1982 |
| WO | WO84/013007 | 4/1984 |

* cited by examiner

*Primary Examiner*—Richard Smith
*Assistant Examiner*—Tania C Courson
(74) *Attorney, Agent, or Firm*—Michael I. Kroll

(57) ABSTRACT

A apparatus for use in surviving at least one of an avalanche and a mudslide. The apparatus includes a housing having a selectively inflatable member stored therein. The apparatus further includes a means connected to the housing for securing the housing to a user and means connected to the selectively inflatable member for inflating the selectively inflatable member. Upon activation of the inflating means the selectively inflatable member is caused to inflate and be expelled from the housing forming a support for the user and stay on a surface of at least of avalanching snow and sliding mud.

2 Claims, 12 Drawing Sheets

AVALANCHE SURVIVAL KIT

BACKGROUND OF THE INVENTION

1. Field of the Invention

The present invention relates generally to a rescue device and, more specifically, to a rescue device for persons caught in an avalanche and/or mudslide. The avalanche survival kit of the present invention includes a backpack style apparatus having means for discharging a body supporting inflatable airbag able to support a predetermined amount of weight. When deployed, the body supporting airbag reduces the chances of the user from being covered with avalanching snow and allows the user to move along the surface of and in a direction of the moving snow or mud. The avalanche survival kit further includes a homing device transmitter which is activated upon deployment of the inflatable airbag.

The airbag incorporates intake/exhaust valve and pressure gauge for monitoring gas pressure and serving as indicator for a discharged airbag. Once inflated the valve is recessed in the body, preventing damage to the valve or airbag, with aperture clearance for attaching and de-attaching the hose coupling.

2. Description of the Prior Art

There are other rescue devices and kits designed for avalanche survival. Typical of these is U.S. Pat. No. 1,230, 290 issued to B. A. Geiger on Jun. 19, 1917.

Another patent was issued to W. Oldham on Jun. 2, 1965 as U.S. Pat. No. 3,362,034. Yet another U.S. Pat. No. 4,114,561 was issued to V. F. Asaro on Sep. 19, 1978, and still yet another was issued on Jan. 13, 1987 to Peter Aschauer as U.S. Pat. No. 4,635,754.

Another patent was issued to Peter Aschauer on Dec. 12, 2000 as U.S. Pat. No. 6,158,380. Yet another U.S. Pat. No. 6,220,909 was issued to Peter Aschauer on Apr. 24, 2001. Another was issued to Ariel Visocekas on Aug. 7, 2001 as U.S. Pat. No. 6,270,386. and still yet another was issued on Oct. 20, 1981 to Howard Porter as U.S. Pat. No. 4,295,438. Another patent was issued to Carl Rowe on Jul. 2, 2002 as U.S. Pat. No. 6,412,482.

A WIPO publication No. WO84013007 was filed by Peter Aschauer on Apr. 12, 1984 and a U.K. patent was issued to Arthur Dixon on Feb. 24, 1982 in Great Britain as Patent No. GB2081660 and still yet another was issued in Canada on Nov. 30, 1998 to Gerald Kampel as Canadian Patent No. CA 2,255,092.

This invention relates to life preservers which consist of inflatable tubes. The object of the invention is to provide in a life preserver of this type a novel and improved means for inflating the same, a container being provided which is connected to the belt and carries a gas under sufficient pressure to inflate the belt when released. The invention also has for its object to provide novel and improved means for opening the container so that it may discharge into the belt.

Stowage means for an inflatable article such as the buoyancy chamber of a lifejacket, comprising an elongated pouch in which such article is compactly accommodated prior to inflation and which is normally held closed by a series of connected toggles passed through loops at least one of its edges, said article having self inflatable traction member which simultaneously effects collective withdrawal of the toggles from the loops to allow deployment of the inflating article. Except for the parts thereof engaged with the pouch-securing loops, the toggles are contained in a flexible guide tube to ensure their free operation around a curved pouch opening, such tube and toggles being protected by flaps closable by a slide-fastener and press studs.

An avalanche rescue marker system consisting of an openable pack assembly and a trigger inflation assembly, the openable pack assembly being carried by the user on his upper back and the trigger inflation assembly being carried by the user on an upper front portion of his outer garment with a gas tube coupled therebetween. The trigger inflation assembly carries a gas cylinder having compressed lighter-than-air gas therein and is coupled to the input of a deflated marker airbag which in turn has its neck portion coupled to a tether which is folded in anti-fouling loops. When a lever is pulled by the wearer the gas in the cartridge enters the airbag, inflating the airbag after which the airbag automatically escapes, pulling the tether upward along with it. The tether is attached to the wearer and hence, the airbag becomes a marker marking the location of the wearer.

A device for producing a rescue signal for use by a person who is lost or has had an accident. The device is in the form of a compact package including a casing containing a deflated and collapsed airbag, and a cartridge of compressed gas, such as helium, air, or $CO_2$ and a hand lever for forcing the cartridge to puncture it. A needle tube has a first, pointed, end for puncturing the cartridge, and a second end extending into the airbag, and the airbag has a sphincter valve normally holding the airbag on the needle tube, and closing when the airbag is inflated and released. A pull tab is provided on the airbag for grasping by the user for releasing the airbag, and a tether line is tied to the airbag and wound on a spool. The casing is normally closed, confining nearly all of the other components and readily opened manually for exposing those elements. It may be small and light in weight for carrying on the person as in hiking, skiing, mountain climbing, etc., or for scuba diving, or it may be larger for carrying in a car, a boat, airplane, etc. The device is made of inexpensive material and may be considered a throw-away item.

Rescue apparatus and method. The apparatus includes a tear-resistant airbag bound to a frame that is securable to a person. To initiate rescue action, the airbag is inflated by pressurized gas to buoy the attached person at, for example, the surface of the avalanche. The apparatus is formed by a frame with a collar to which the airbag is attached. A filling mechanism for the airbag is positioned within the frame and includes a nozzle valve that operates in accordance with Venturi action.

Lifesaving device for people in avalanches with two airbags, where at least one airbag is a tear-resistant airbag, which can be securable close to a user's body by means of an attachment. In an emergency the device is inflated by mean of pressurized gas so that it, just like a buoyancy body, keeps its user at the surface of the avalanche.

A filling device connects at least one of the airbags to at least one pressurized gas container. The filling device includes a device to open the container and is connected to a filling hole of the airbag, in which case the pressurized gas container with filling device is secured, independent of the airbag, to the body of the user. Each airbag includes at least one pressurized gas container. The filling device for a complete, fulfilling of the airbags by means of the pressurized gas drawn from the pressurized gas bottles is connected via a pressure line to the filling hole of the airbag. All opening devices can be actuated via a common release mechanism.

An avalanche life saving system has at least one inflatable buoyancy body of airbag design secured close to a user's body, a filling unit, a compressed gas unit with a compressed gas container and a release mechanism capable of actuation without a tool and attached to the compressed gas unit via a quick coupling and a release tubing. Compressed gas is transmitted to the buoyancy body via the filling unit upon actuation of the release mechanism. Actuation of the release mechanism produces a controlled pressure wave, which starts the flow of compressed gas from the compressed gas container to the filling unit).

An avalanche life jacket having an airbag inflatable by a gas release system upon actuation is disclosed. The life jacket provides a torso strap and buckles for attaching the life jacket to the user. Prior to inflation, the airbag is folded and enclosed within the harness. The harness encloses the airbag via an enclosure mechanism, which opens during inflation of the airbag to allow the airbag to fully expand. The life jacket further comprises a gas release system, which may be automatically actuated by an accelerometer and/or manually actuated by the user's pulling of a release handle. Upon actuation, the gas release system releases gas into and inflates the airbag. The airbag inflates to surround at least the back and sides of the user's head to thereby provide physical protection and a thermal buffer between a portion of the user and the external environment, for example, during and after an avalanche and to facilitate search and rescue of the user after the avalanche. The inflated airbag also provides a buoyant force against the downward force exerted by the current of the avalanche as well as a supply of breathable gas. A hood or mesh is also included to shield the user from the external elements such as snow and thereby facilitate in preventing injury and/or suffocation during a fall or an avalanche.

The avalanche survival pack assembly includes a main support chest pack assembly to be secured as by a waist support assembly and a shoulder harness assembly to a user thereof; an oxygen supply assembly or means to provide oxygen through a nose/mouth mask assembly to be worn by an avalanche victim and placed in operation on initially observing being caught up within an avalanche condition; an auxiliary power supply assembly to provide electrical battery power to an oxygen conserving assembly or means and a radio signal transmit beacon assembly or means; 4) the radio signal transmit beacon assembly to transmit a radio signal therefrom for aiding in locating the avalanche victim by avalanche rescuers; a visual location indicator assembly having a lengthy, brightly colored ribbon-like material and having one end connected to the main support chest pack assembly and the other end to be trailed outwardly hoping to be exposed on a top surface of the avalanche snow pack; and a control circuit assembly operable to automatically energize itself on closing an "on" switch to provide oxygen to the avalanche victim even though the victim may be in an unconscious condition. The main pack assembly is provided with a CO2 absorbing foam material which is important in increasing the chances of an avalanche victim's survival. The oxygen supply assembly has been modified with an oxygen conserving assembly to provide a pulsating supply of oxygen to the avalanche victim which is sufficient to provide a life-sustaining oxygen condition for a period of at least one hour. The nose/mouth mask assembly is provided with a face mask member having discharge valve members to discharge carbon dioxide from the nose and mouth sections of the avalanche victim and having a teeth grip member to be grasped by teeth of the avalanche victim to securely hold in a usage position.

Rescue apparatus and method. The apparatus includes a tear-resistant airbag bound to a frame that is securable to a person. To initiate rescue action, the airbag is inflated by pressurized gas to buoy the attached person at, for example, the surface of the avalanche. The apparatus is formed by a frame with a collar to which the airbag is attached. A filling mechanism for the airbag is positioned within the frame and includes a nozzle valve that operates in accordance with Venturi action.

An inflatable garment which is close fitting at neck, ankles, and wrists is worn by a person getting into it through an aperture which extends from neck to crutch and which is closed by a zip fastener or other suitable means. Canisters of a compressed gas which is lighter than air are fitted to the waistband of the garment. For fire escape the gas must also be non-inflammable. The gas is released by a quick release mechanism into voluminous pouches at the sides, on top and behind the shoulders. The gas will provide lift to the body overcoming much of the body's weight to the extent of allowing the person to step off the level at which there is danger and descend to a lower level more slowly than without the garment.

An improved rescue device for locating persons buried by avalanches operates in either a transmit mode or a receive mode. A first belt terminator is lockably engagable with a first belt terminator receptor on a case, and is associated with a power switch. The power switch switches between a power on position and a power off position in response to the engagement and disengagement of the first belt terminator with the first belt terminator receptor, and preferably is also independently manually operable. A second belt terminator is lockably engagable with a second belt terminator receptor on the case, and is associated with a mode switch. The mode switch toggles between a transmit mode position and a receive mode position, and preferably is also independently manually operable. A signal processing system generates a visual display which provides graphic information to expedite searching. Prompt icons are displayed when a coarse search or a pin-point search should be conducted, when the stage of a multistage amplifier should be changed, or when the rescue device needs to be reoriented to obtain maximum signal strength. Preferably, the signal processing system also displays the signal strength as a bar graph and displays an estimated distance to the buried transmitter.

While these improved rescue devices for locating persons buried by avalanches may be suitable for the purposes for which they were designed, they would not be as suitable for the purposes of the present invention, as hereinafter described.

SUMMARY OF THE PRESENT INVENTION

The present invention relates generally to a rescue device and, more specifically, to a rescue device for persons caught in an avalanche and/or mudslide. The avalanche survival kit of the present invention includes a backpack style apparatus having means for discharging a body supporting inflatable airbag able to support a predetermined amount of weight. When deployed, the body supporting airbag reduces the chances of the user from being covered with avalanching snow and allows the user to move along the surface of and in a direction of the moving snow or mud. The avalanche survival kit further includes a homing device transmitter which is activated upon deployment of the inflatable airbag.

A primary object of the present invention is to provide an avalanche survival kit that overcomes the shortcomings of the prior art.

Another object of the present invention is to provide a rescue device for persons involved with avalanches and/or mudslides.

Still another object of the present invention is to provide an avalanche survival kit that securely attaches to the user.

Another object of the present invention is to provide an avalanche survival kit that includes a backpack which is removeably secured to the user.

Yet another object of the present invention is to provide an avalanche survival kit including an selectively inflatable body positioned within the backpack for deployment in the case of an avalanche.

Another object of the present invention is to provide an avalanche survival kit wherein the selectively inflatable body is able to support a predetermined amount of weight.

Still another object of the present invention is to provide an avalanche survival kit wherein the selectively inflatable body, when inflated ranges between substantially five feet and substantially seven feet in length.

Another object of the present invention is to provide an avalanche survival kit wherein the selectively inflatable body, when inflated, ranges between substantially two feet and substantially four feet in width.

An even further object of the present invention is to provide an avalanche survival kit wherein the selectively inflatable body is tear-resistant.

Yet another object of the present invention is to provide an avalanche survival kit wherein the selectively inflatable body is able to keep the user on the surface of at least one of snow, mud and debris.

Still yet another object of the present invention is to provide an avalanche survival kit wherein the selectively inflatable body is deployed by at least one of a gas and chemical reaction similar to an airbag in a motor vehicle.

A further object of the present invention is to provide an avalanche survival kit wherein the gas used to deploy the airbag is helium gas or other like gas.

Yet another object of the present invention is to provide an avalanche survival kit wherein the selectively inflatable body can deflate when no longer in use.

Another object of the present invention is to provide an avalanche survival kit including a transmitter homing device when deployed.

Still an even further object of the present invention is to provide an avalanche survival kit wherein the transmitter is a global positioning transmitter able to transmit a signal able to provide a precise location to potential rescuers.

Yet another object of the present invention is to provide an avalanche survival kit wherein the selectively inflatable device distinguishingly colored and marked for easy visual identification thereof.

Another object of the present invention is to provide an avalanche survival kit that is simple and easy to use.

A still further object of the present invention is to provide an avalanche survival kit that is economical in cost to manufacture.

Additional objects of the present invention will appear as the description proceeds.

The present invention overcomes the shortcomings of the prior art by providing a rescue device for persons involved with avalanches and the like that comprises a full body protection.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 10:
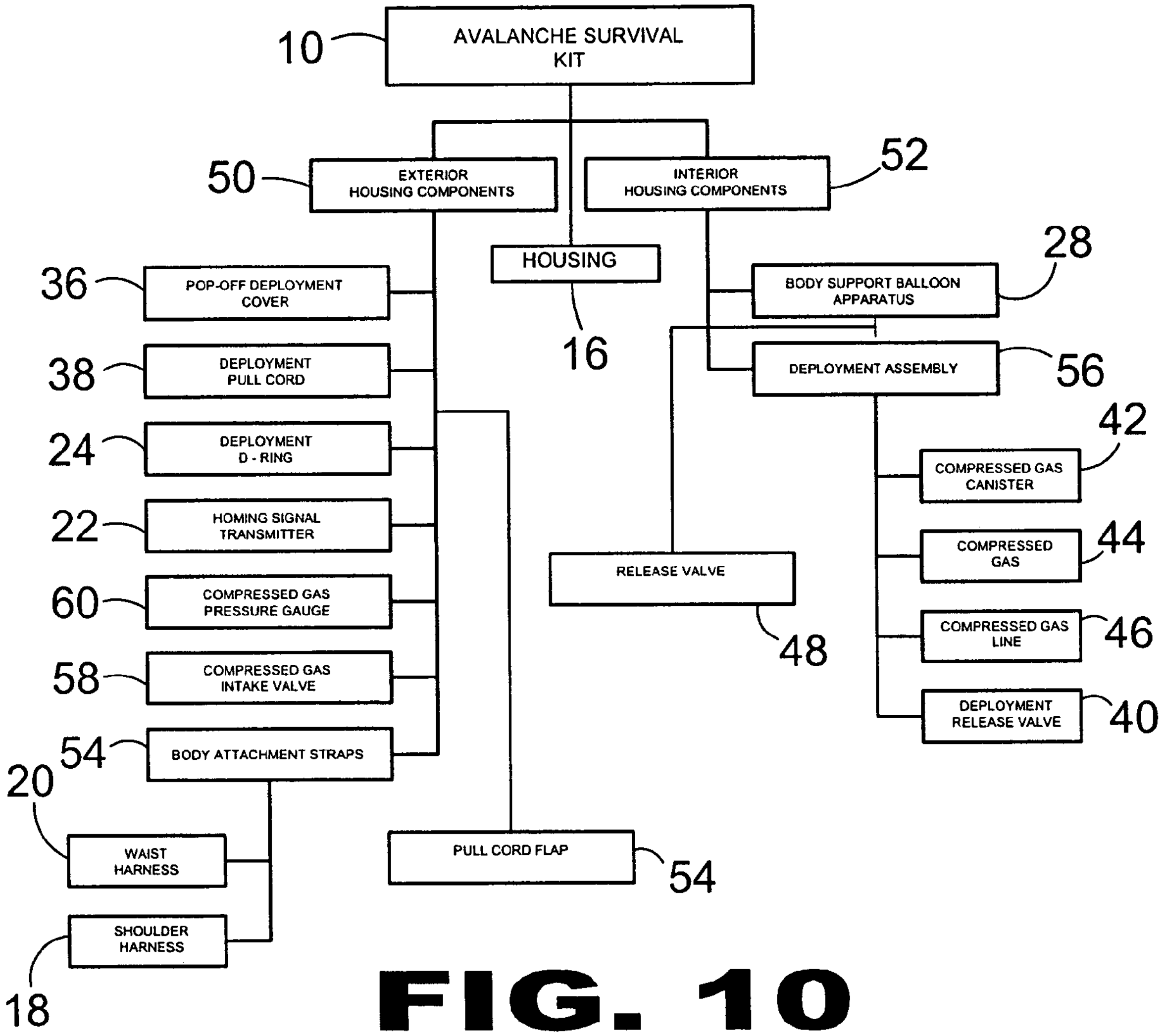
Figure 11:
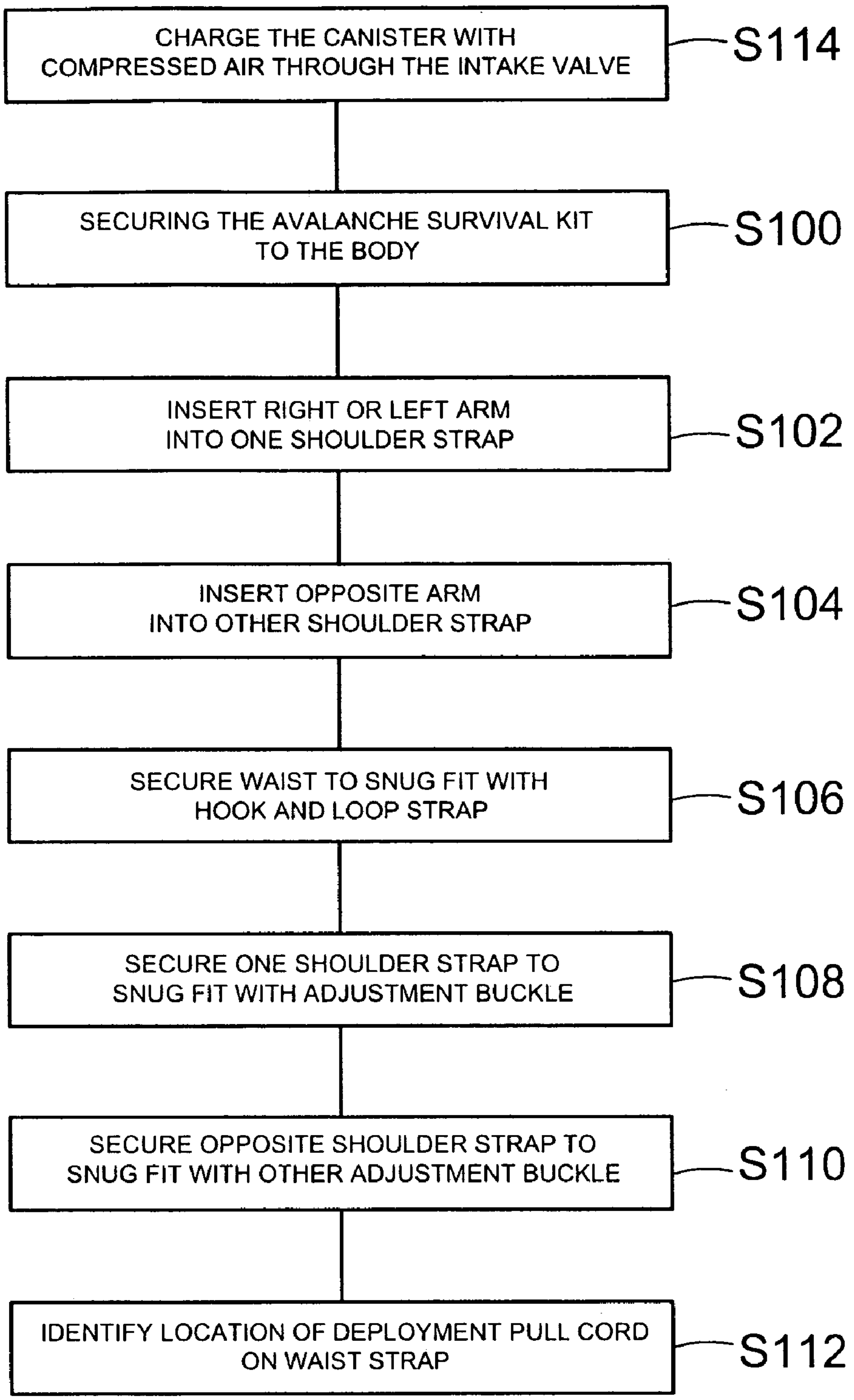
Figure 12:
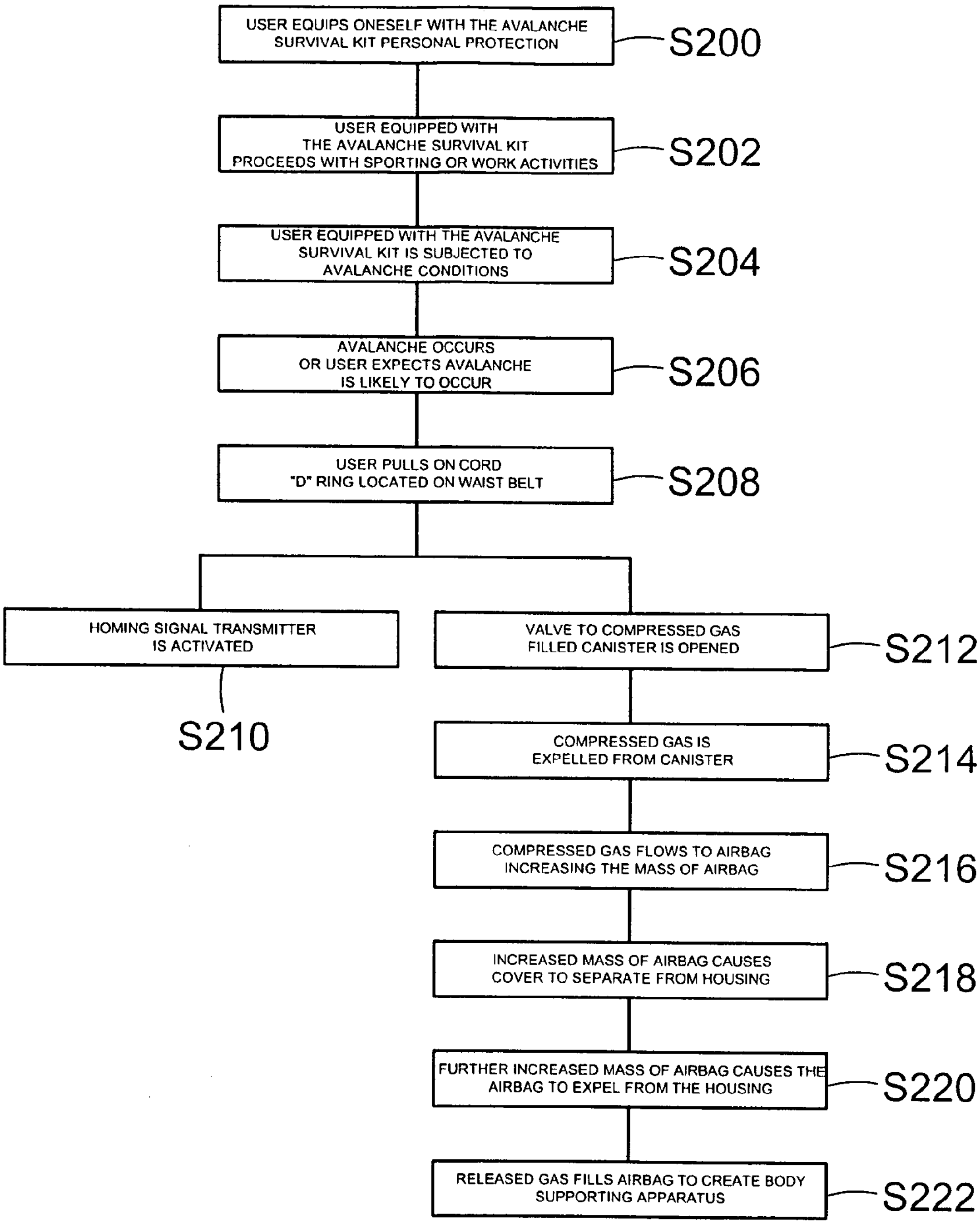

FIG. 10 a block diagram of the avalanche survival kit of the present invention;

FIG. 11 is a flow diagram of the avalanche survival kit of the present invention; and FIG. 12 is a flow diagram of the avalanche survival kit of the present invention.

DESCRIPTION OF THE REFERENCED NUMERALS

Turning now descriptively to the drawings, in which similar reference characters denote similar elements throughout the several views, the Figures illustrate the avalanche survival kit of the present invention. With regard to the reference numerals used, the following numbering is used throughout the various drawing figures.

10 avalanche survival kit of the present invention
12 user
14 avalanche
16 housing
17 top side
18 adjustable arm harness
19 bottom side
20 waist harness
21 front side
22 transmitter
23 rear side
24 "D" ring
26 transmission
28 airbag
30 hook and loop fastening leg strap
32 hook and loop fasteners
34 pull cord flap
36 pop off cover
37 aperture
38 pull cord

40 valve
42 compressed gas canister
44 compressed gas
46 compressed gas line
48 release valve
50 exterior housing components
52 interior housing components
54 body attachment straps
56 deployment assembly
58 intake valve
60 pressure gauge

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate an avalanche survival kit of the present invention which is indicated generally by the reference numeral 10.

Figure 1:
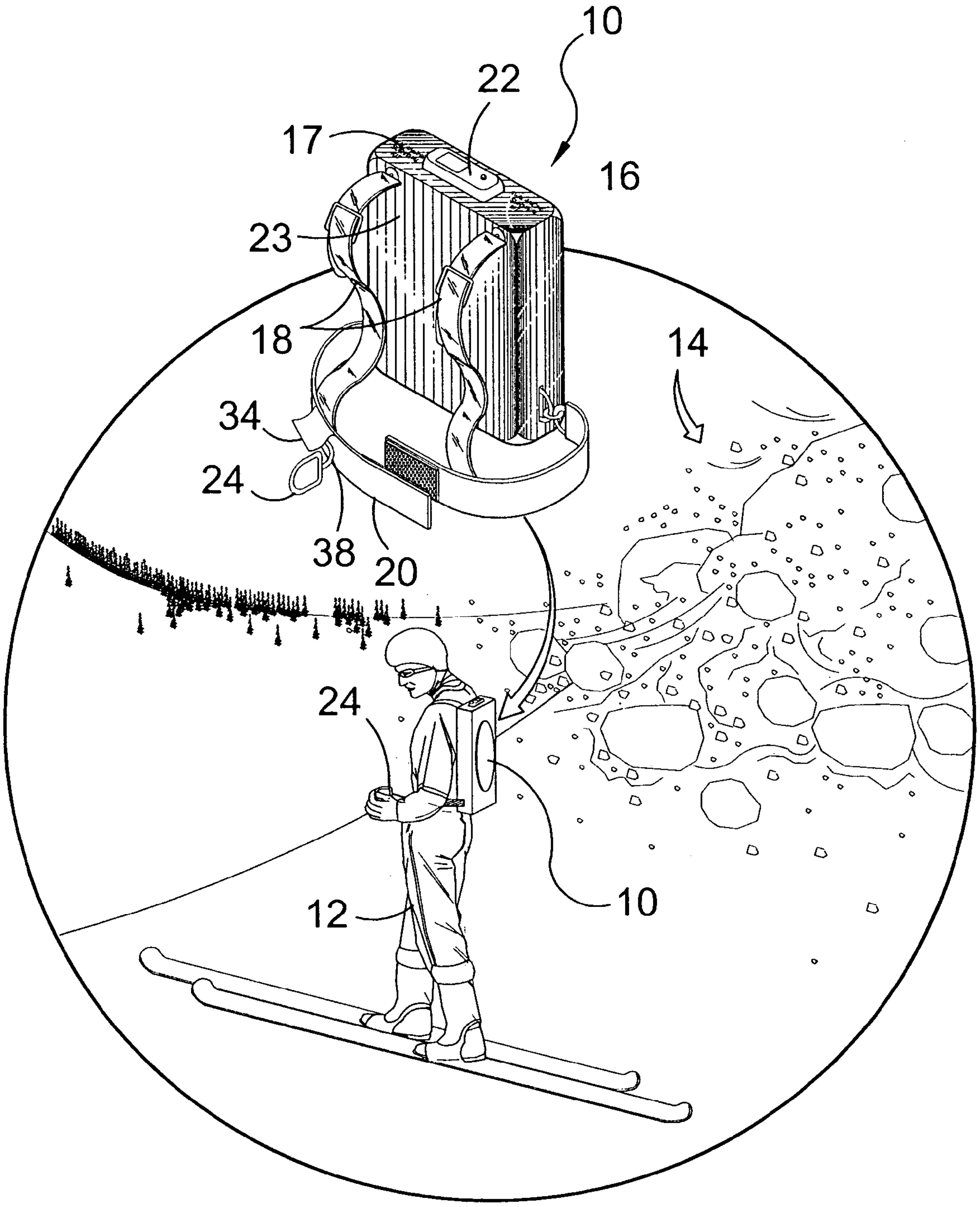
FIG. 1 is an illustrative view of the avalanche survival kit of the present invention in use.
Figure 2:
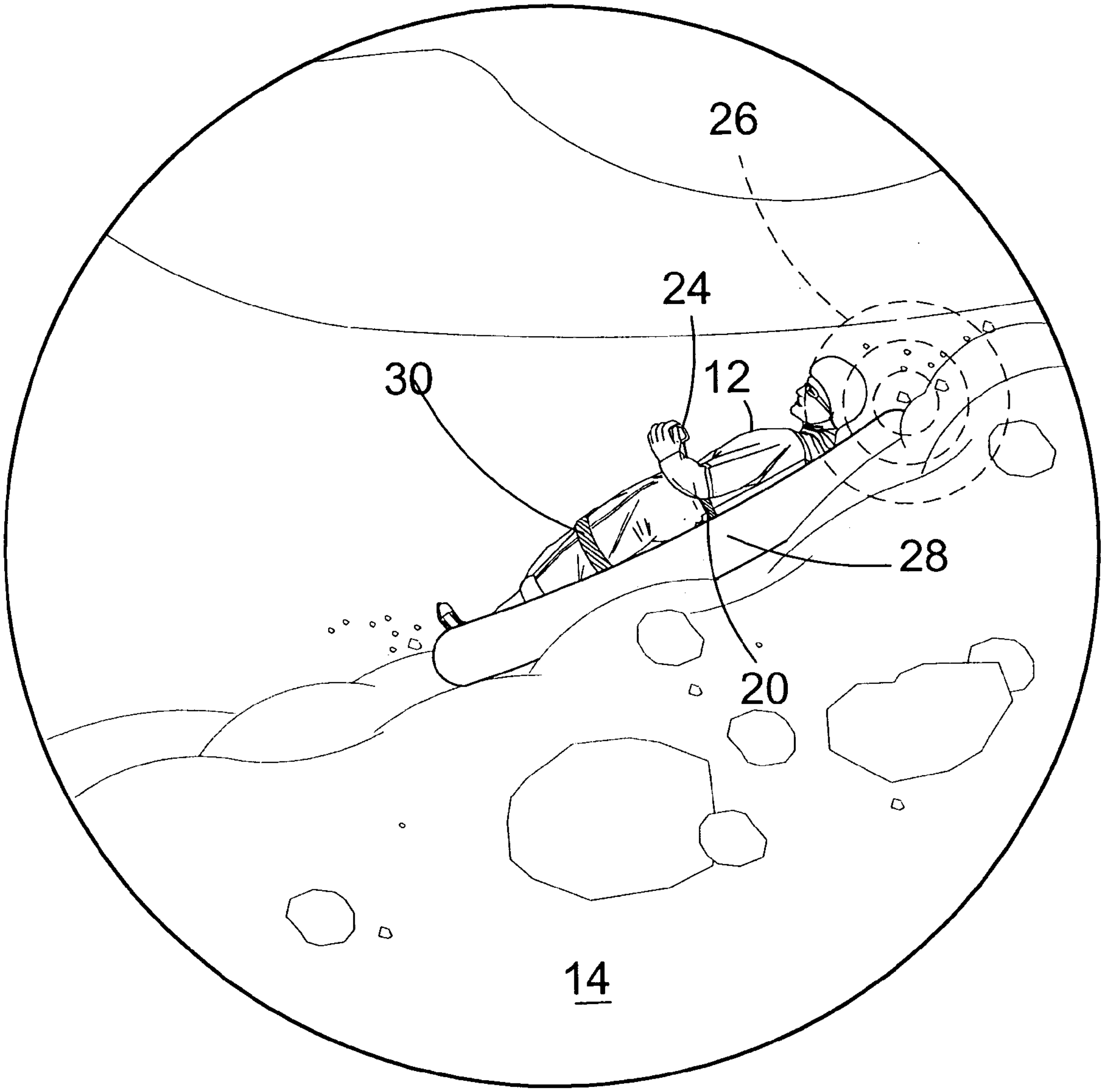
FIG. 2 is an illustrative view of the avalanche survival kit of the present invention in use.

FIG. 1 is an illustrative view of the avalanche survival kit 10 of the present invention in use. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another.

Located on a first outer edge of one of the waist harness straps is a pull cord flap 34 which protects a pull cord 38. Positioned at one end of the pull cord 38 is a "D" ring 24. The user 12 pulls the "D" ring 24 which in turn pulls the pull cord 28 and deploys the airbag 28 of the avalanche survival kit 10 of the present invention. The housing 16 further includes a transmitter 22 positioned thereon. The transmitter 22 is also connected to at least one of the airbag 28 and the pull cord 38 and is activated upon at least one of deployment of the airbag 28 and pulling of the pull cord 38. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Shown herein, a user 12 is wearing the avalanche survival kit 10 while skiing when an avalanche 14 occurs. In response to the avalanche 14, the user 12 pulls the "D" ring 24 to deploy the airbag 28 as will be discussed hereinafter regarding FIG. 2 of the avalanche survival kit 10 of the present invention.

FIG. 2 is an illustrative view of the avalanche survival kit 10 of the present invention in use. The avalanche survival kit 10 includes the housing 16 selectively connected to the user 12 by the arm harness 18 and the waist harness 20. The housing 16 includes the selectively inflatable tear-resistant airbag 28 positioned therein which, when fully inflated reveals a leg strap 30. The housing 16 also includes the transmitter 22 for transmitting the signal 26 therefrom. Shown herein the user 12 is wearing the avalanche survival kit 10 and anticipates the avalanche 14. As shown in FIG. 1, the user 12 actuates the "D" ring 24, which deploys the airbag 28 from within the housing 16. The manner in which the airbag 28 is deployed from the housing 16 will be discussed hereinafter with respect to FIGS. 5-8. The deployment results in the airbag 28 being inflated. The user 12 is then able to further secure the airbag 28 to his body through the use of the Velcro leg strap 30. The user 12 leans back onto the inflated airbag 28 and is able to remain above the surface of the avalanche 14. Additionally, deployment of the avalanche survival kit 10 activates the transmitter 22, shown in FIG. 1, to send out a signal 26 to alert others of the location of the user 12.

Figure 3:
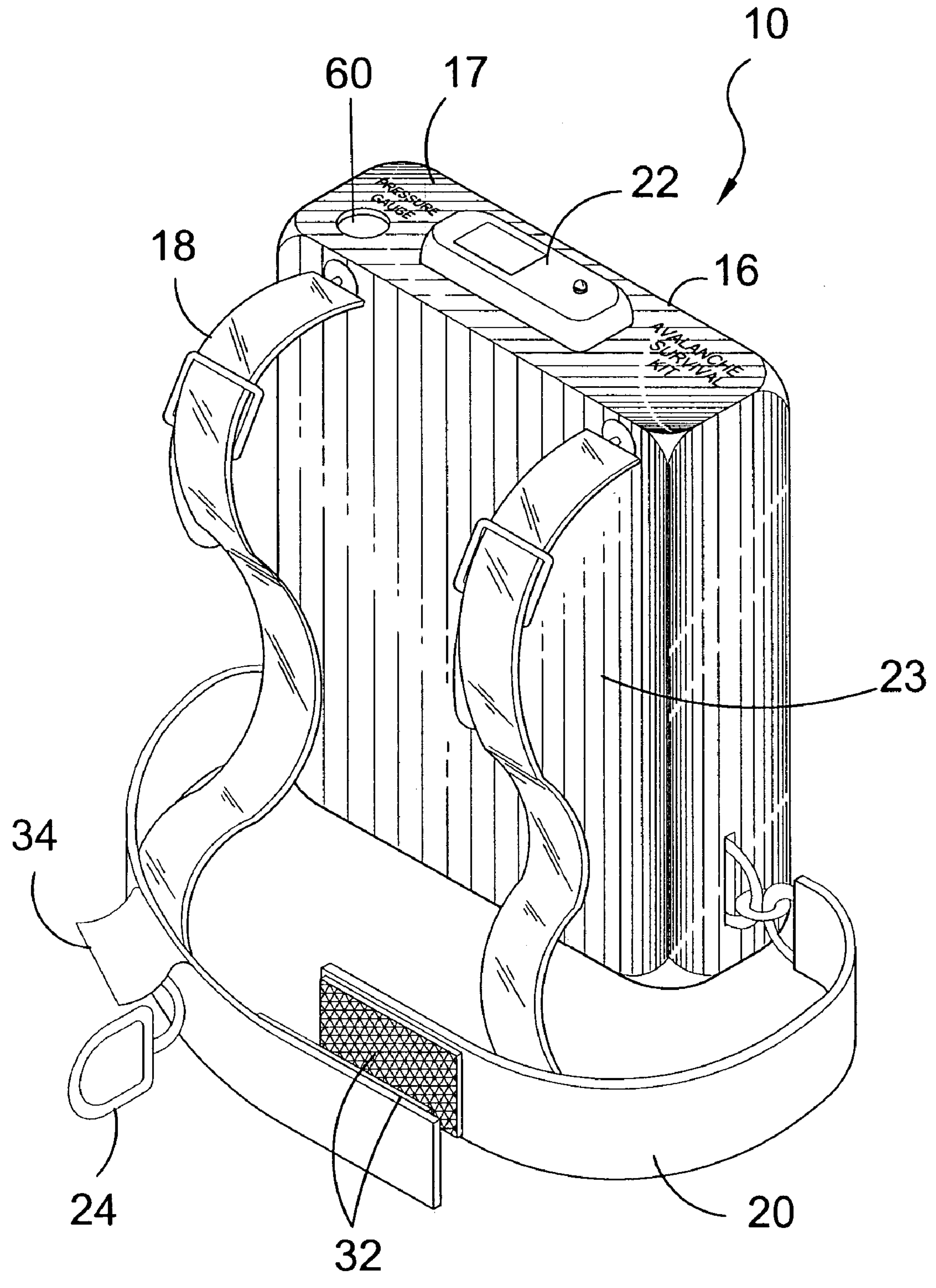
FIG. 3 is a front perspective view of the avalanche survival kit of the present invention.

FIG. 3 is a back perspective view of the avalanche survival kit 10 of the present invention. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another.

Located on a first outer edge of one of the waist harness straps is a pull cord flap 34 which protects a pull cord 38. Positioned at one end of the pull cord 38 is a "D" ring 24. The user 12 pulls the "D" ring 24 which in turn pulls the pull cord 28 and deploys the airbag 28 of the avalanche survival kit 10 of the present invention. The housing 16 further includes a transmitter 22 positioned thereon. The transmitter 22 is also connected to at least one of the airbag 28 and the pull cord 38 and is activated upon at least one of deployment of the airbag 28 and pulling of the pull cord 38. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Figure 4:
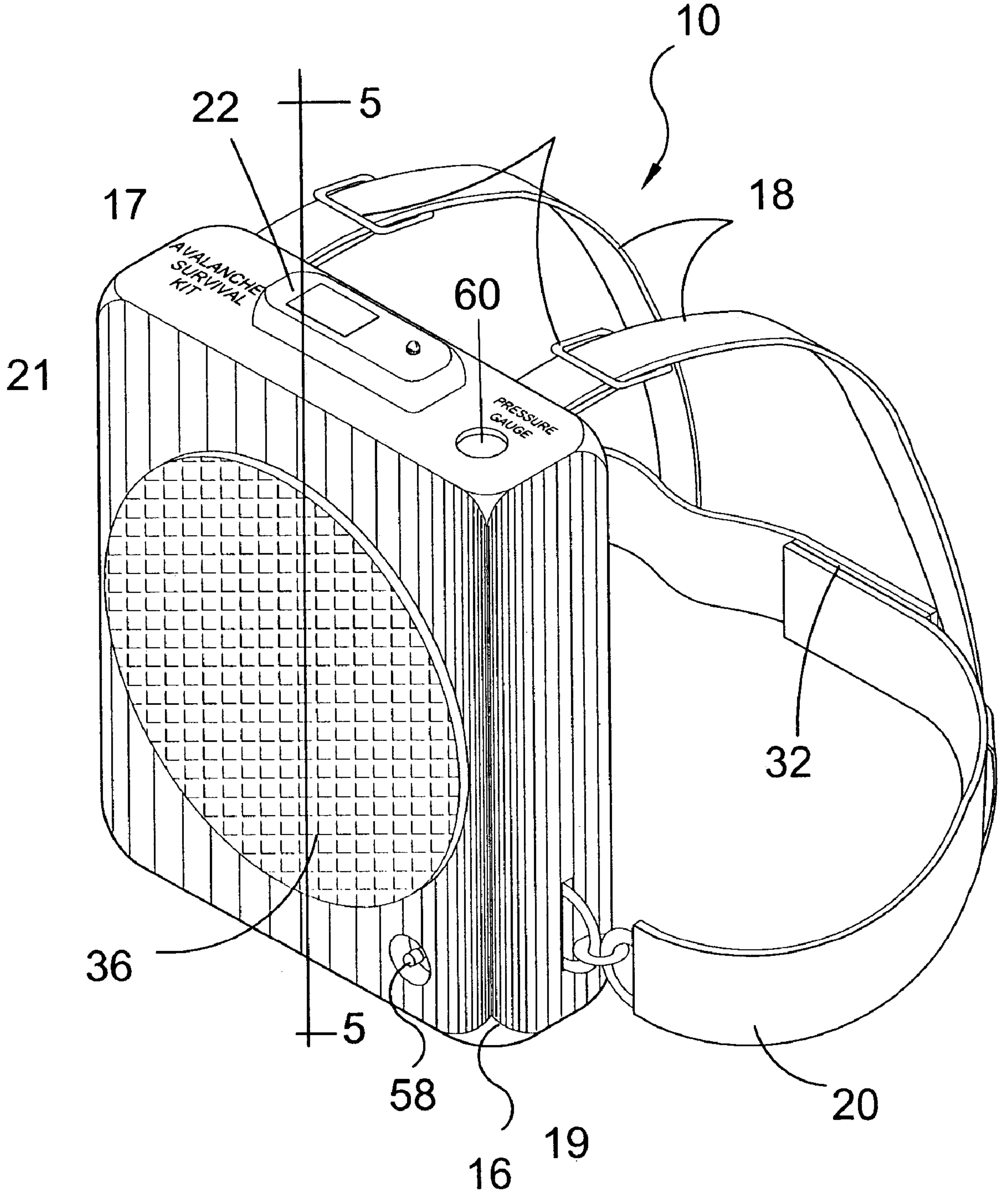
FIG. 4 is a rear perspective view of the avalanche survival kit of the present invention.

FIG. 4 is a front perspective view of the avalanche survival kit 10 of the present invention. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another. An air intake valve 58 is positioned upon the lower side of the housing 16 providing means to charge and discharge the compressed air 44 to and from the compressed gas canister 42. A pressure gauge 60 is located adjacent to the transmitter 22 providing means to monitor the pressure of the compressed gas 44.

Positioned on the front side 21 of the housing 16 a is selectively displaceable cover 36. Upon inflation of the airbag 28, as shown in FIG. 2, cover 36 is caused to be ejected from the housing 16. The housing 16 further includes a transmitter 22 positioned thereon, and upon deployment of the airbag 28, the transmitter 22 is activated. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Figure 5:
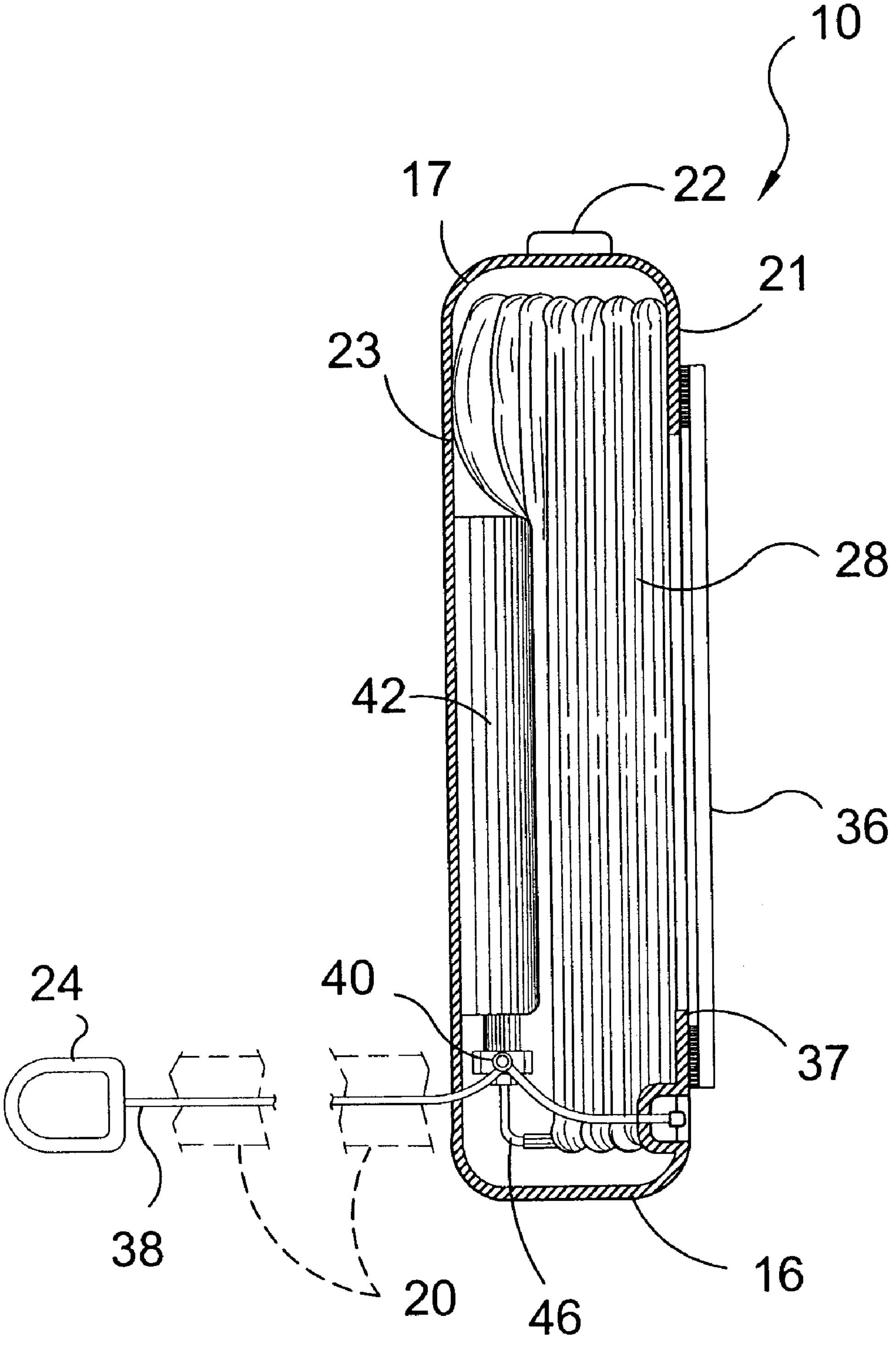
FIG. 5 is a sectional view of the avalanche survival kit of the present invention.

FIG. 5 is a sectional view of the avalanche survival kit 10 of the present invention taken along line 5-5 in FIG. 4. The avalanche survival kit 10 includes the housing 16 for retaining the airbag 28 therein. The housing 16 further includes the transmitter 22 positioned thereon. The housing 16 has a front size 21 and a rear side 23. When the housing 16 is positioned on the user 12 as shown in FIG. 1, the rear side 23 is positioned adjacent to the back of the user 12. The housing is secured to the user via the arm harness 18 and the waist harness 20 as shown in FIG. 1. The front side 21 side of the housing 16 includes an aperture 37 which is covered by the removeable cover 36. The aperture 37 allows the airbag 28, upon inflation, to pass therethrough to displace the cover 36 from the front side 21. An air intake valve 58 is positioned upon the lower side of the housing 16 providing means to charge and discharge the compressed air 44 to and from the compressed gas canister 42. As illustrated in FIGS. 4 and 5, intake valve 58 is connected to vain 40.

Positioned within the housing 16 is the airbag 28 and a mechanism for deploying the airbag 20 from within the housing 16. The deployment mechanism includes a source of compressed gas 42 having a line 46 connected thereto. The line 46 is connected at the end opposite the source 42 to the airbag 28. A valve 40 is positioned between the source 42 and the line 46 and remains in a first closed position thereby preventing the gas in the source 42 to pass through the line 46 and into the airbag 28. The pull cord 38 is connected to the valve for actuation thereof. The D ring 24 is connected to the pull cord 38 at an end opposite the connection of the valve 40 and upon actuation thereof, the valve 40 moves from a first closed position to a second open position. When the valve 40 is in the second open position, gas from the source 42 passes through the line 46 and into the airbag 28. This deployment process will be discussed in greater detail hereinafter with specific reference to FIGS. 6-8. The compressed gas 44 includes but is not limited to a pressurized gas such as helium, and is used to inflate the airbag 28 and keep it buoyant. The compressed gas 44 being helium is described for purposes of example only and maybe be any non-combustible gas that is able to rapidly inflate the airbag 28 and cause the airbag 28 to remain on the surface of avalanching snow and/or mud.

Figure 6:
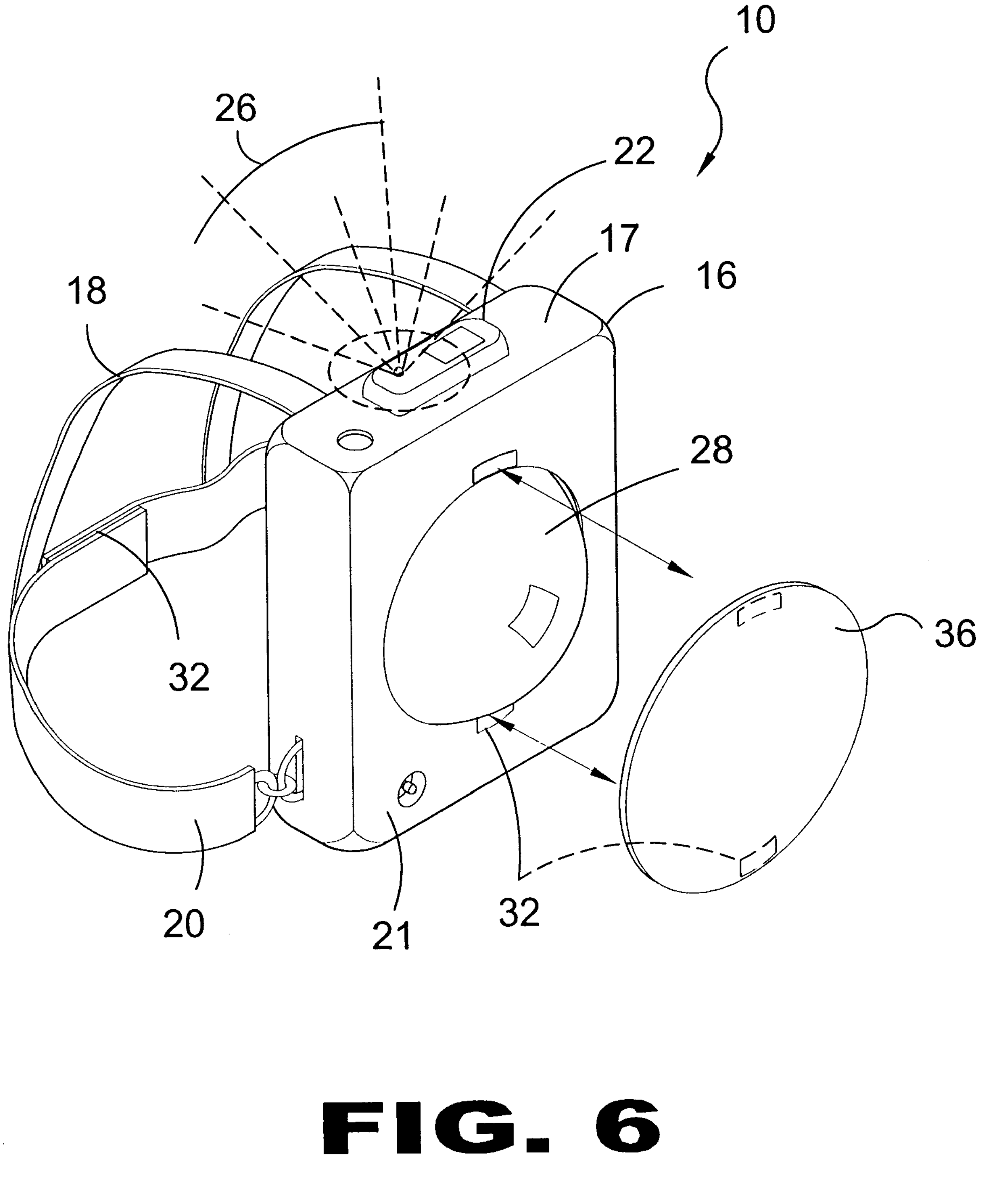
FIG. 6 is a rear perspective view of the avalanche survival kit of the present invention.

FIG. 6 is a front perspective of the avalanche survival kit 10 of the present invention. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another. An air intake valve 58 is positioned upon the lower side of the housing 16 providing means to charge and discharge the compressed air 44 to and from the compressed gas canister 42. A pressure gauge 60 is located adjacent to the transmitter 22 providing means to monitor the pressure of the compressed gas 44.

Positioned on the front side 21 of the housing 16 a is selectively displaceable cover 36. Upon inflation of the airbag 28, as shown in FIG. 2, cover 36 is caused to be ejected from the housing 16. The housing 16 further includes a transmitter 22 positioned thereon, and upon deployment of the airbag 28, the transmitter 22 is activated. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Shown herein, the avalanche survival kit 10 has been deployed. The deployment results in the airbag 28 being inflated. The airbag 28 is caused to inflate by pulling on the D-ring 24 as shown in FIG. 5 thereby opening the valve 40 and allowing the compressed gas 44 to pass through the gas line 46 and into the airbag 28. The inflating airbag 28 exerts a force on the pop-off cover 36 and displaces the cover 36 from the front side 21 of the housing 16. Upon inflating the airbag 28, the transmitter 22 is caused to transmit a signal 26 for receipt by a rescuer to alert the rescuer of the location of the user 12. The transmitter 22 is selectively activated by at least one of actuation of the D-ring 24, inflation of the airbag 28 and displacement of the cover 36.

Figure 7:
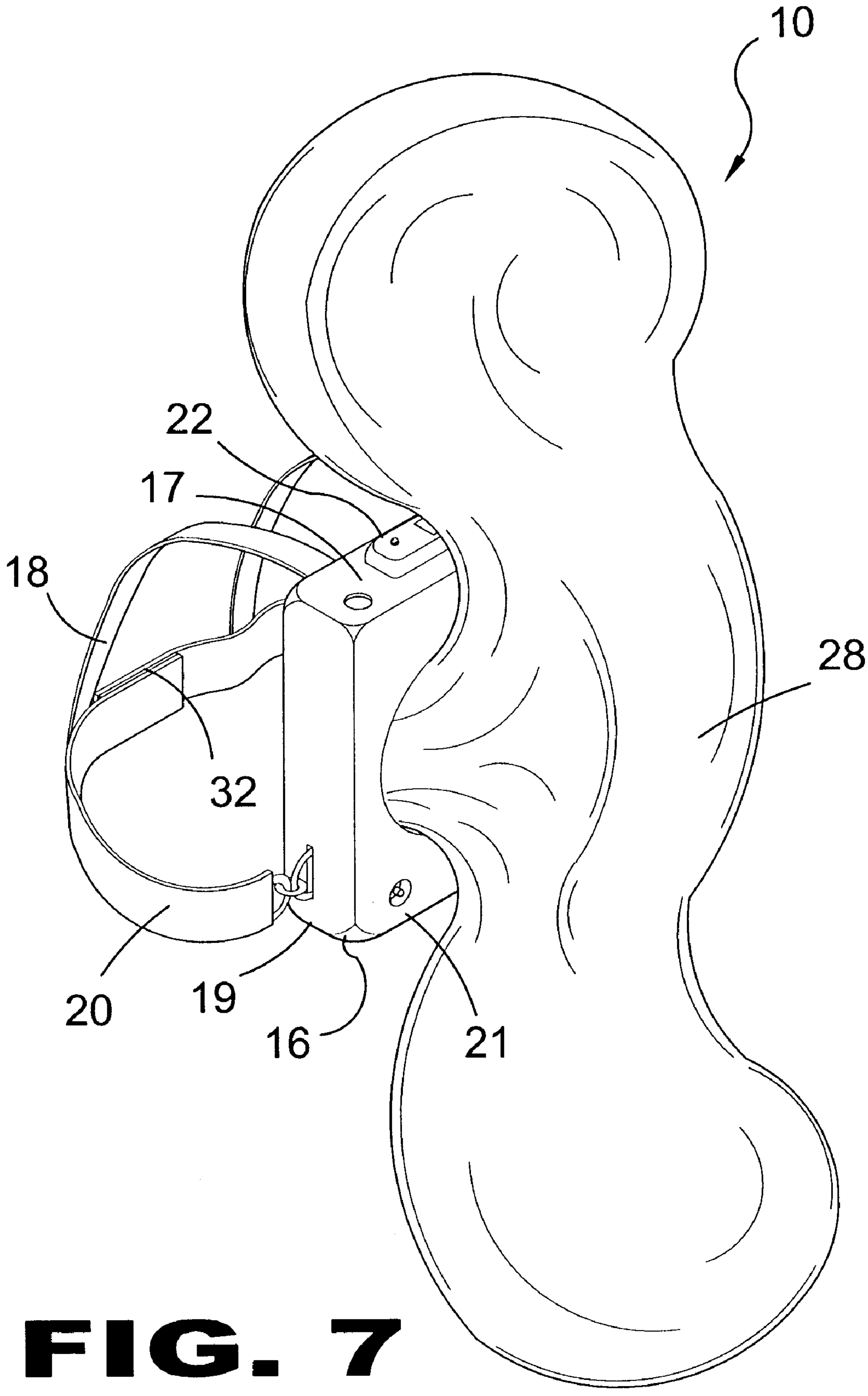
FIG. 7 is a rear perspective view of the avalanche survival kit of the present invention.

FIG. 7 is a front perspective view of the avalanche survival kit 10 of the present invention. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another.

Positioned on the front side 21 of the housing 16 a is selectively displaceable cover 36. Upon inflation of the airbag 28, as shown in FIG. 2, cover 36 is caused to be ejected from the housing 16. The housing 16 further includes a transmitter 22 positioned thereon, and upon deployment of the airbag 28, the transmitter 22 is activated. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Shown herein, the avalanche survival kit 10 has been deployed. The deployment results in the airbag 28 being inflated. The airbag 28 is caused to inflate by pulling on the D-ring 24 as shown in FIG. 5 thereby opening the valve 40 and allowing the compressed gas 44 to pass through the gas line 46 and into the airbag 28. The inflating airbag 28 exerts a force on the pop-off cover 36 and displaces the cover 36 from the front side 21 of the housing 16. Upon inflating the airbag 28, the transmitter 22 is caused to transmit a signal 26 for receipt by a rescuer to alert the rescuer of the location of the user 12. The transmitter 22 is selectively activated by at least one of actuation of the D-ring 24, inflation of the airbag 28 and displacement of the cover 36. FIG. 7 shows the airbag 28 being at least partially inflated.

Figure 8:
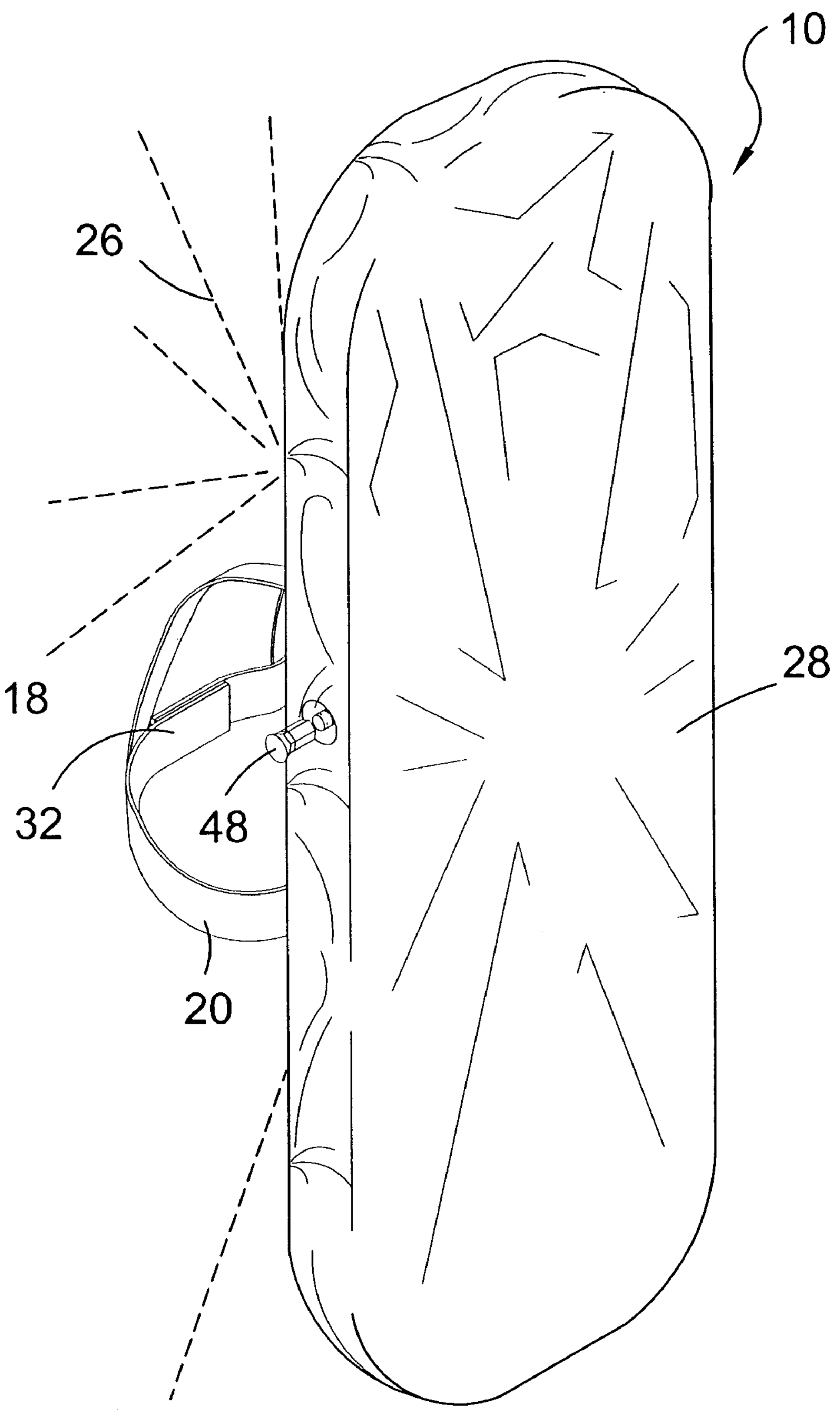
FIG. 8 is a rear perspective view of the avalanche survival kit of the present invention.

FIG. 8 is a front perspective view of the avalanche survival kit 10 of the present invention. The avalanche survival kit 10 includes a housing 16 having a tear-resistant selectively inflatable airbag 28, as shown in FIG. 2, positioned therein. The housing 16 is formed preferably as a backpack and includes a top end 17, a bottom end 19, a front side 21, and a back side 23. The housing is substantially rectangular in shape. However, the housing 16 may be formed in any geometric shape. The housing 16 is removeably connected to back of the user 12. The housing 16 is connected to the user via arm harness 18 and waist harness 20. The arm harness 18 is attached at a first end to the backside 23 of the housing 16 proximate the top end 17 thereof. A second end of the arm harness 18 opposite the first end are releaseably connected to a respective one of the waist harness 20. The waist harness straps 20 extend from each side of the housing 16 proximate the bottom end 19 thereof. At an end of each waist harness strap 20 opposite the connection to the housing are hook and loop fasteners 32 for securing the waist harness straps 20 to one another.

Positioned on the front side 21 of the housing 16 a is selectively displaceable cover 36. Upon inflation of the airbag 28, as shown in FIG. 2, cover 36 is caused to be ejected from the housing 16. The housing 16 further includes a transmitter 22 positioned thereon, and upon deployment of the airbag 28, the transmitter 22 is activated. Upon activation of the transmitter 22, a signal 26 as shown in FIG. 2, is emitted thereby for receipt by a third party rescuer. This signal is able to direct the rescuer to the user 12 and increase the chance of survival. Preferably, the transmitter 22 is formed integral with the housing 16 thereby ensuring that the signal transmitted from the transmitter 22 is able to direct the rescuer receiving the signal to the user 12 directly to the user. The transmitter 22 is located on the top 17 of the housing 16. However, the transmitter 22 may be selectively positioned on any side of the housing 16.

Shown herein, the avalanche survival kit 10 has been deployed. The deployment results in the airbag 28 being inflated. The airbag 28 is caused to inflate by pulling on the D-ring 24 as shown in FIG. 5 thereby opening the valve 40 and allowing the compressed gas 44 to pass through the gas line 46 and into the airbag 28. The inflating airbag 28 exerts a force on the pop-off cover 36 and displaces the cover 36 from the front side 21 of the housing 16. Upon inflating the airbag 28, the transmitter 22 is caused to transmit a signal 26 for receipt by a rescuer to alert the rescuer of the location of the user 12. The transmitter 22 is selectively activated by at least one of actuation of the D-ring 24, inflation of the airbag 28 and displacement of the cover 36.

The airbag 28 is shown in its fully inflated state. The airbag 28 further includes a release valve 48 for selectively releasing the gas contained therein in order to deflate the airbag 28 when no long needed. When fully inflated the airbag 28 is able to support a predetermined amount of weight of user while staying on the surface of at least one of avalanching snow and sliding mud.

Figure 9:
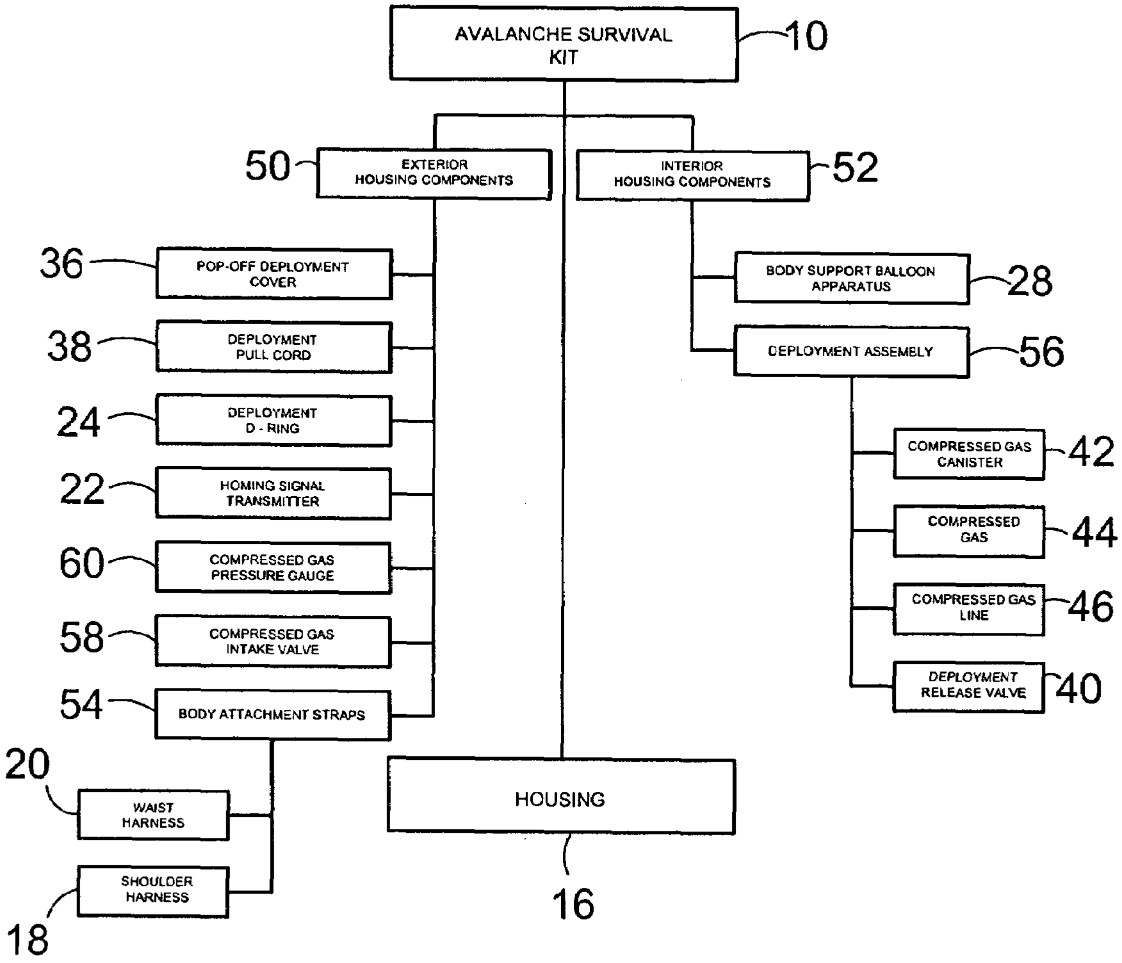
FIG. 9 is an illustrative view of the avalanche survival kit of the present invention in use.

FIG. 9 is a block diagram of the avalanche survival kit 10 of the present invention. The avalanche survival kit 10 includes the housing 16 having exterior housing components 50 and interior housing components 52. The exterior housing components 50 include the pop off cover 36, the pull cord 38, the "D" ring, 24, the transmitter 22, and the body attachment straps 54 which include the waist harness 20 and the shoulder harness 18. The interior housing components 52 include the airbag 28 and the deployment assembly 56. The deployment assembly includes the compressed gas canister 42, the compressed gas 44, the compressed gas line 46 and the valve 40.

The housing 16 is attached to the user via the body attachment straps 54. To deploy the avalanche survival kit 10, the user pulls on the "D" ring 24, which extends from the waist harness 20. Pulling the "D" ring 24 in turn pulls the pull cord 38. This force on the pull cord 28 opens the valve 40 and allows the compressed gas 44 to flow from the compressed gas canister 42 into the compressed gas line 46. The compressed gas 44 then flows into the airbag 28 for inflation thereof. As the airbag inflates the pop off cover 36 is displaced and the airbag extends out from the housing to be used to keep the user 12 above the surface of the avalanche 14, shown in FIG. 2. Additionally, when the avalanche survival kit 10 is deployed, the transmitter 22 is activated and sends out a transmission 26 to alert others of the location of the user 12.

FIG. 10 is a block diagram of the avalanche survival kit 10 of the present invention. The avalanche survival kit 10 includes the housing 16 having exterior housing components 50 and interior housing components 52. The exterior housing components 50 include the pop off cover 36, the pull cord 38, the pull cord flap 34, the "D" ring, 24, the transmitter 22, and the body attachment straps 54. The waist harness 20 and the shoulder harness 18 make up the body attachment straps 54. The interior housing components 52 include the airbag 28 and the deployment assembly 56. The airbag 28 has a release valve 48. The deployment assembly includes the compressed gas canister 42, the compressed gas 44, the compressed gas line 46 and the valve 40.

The housing 16 is attached to the user via the body attachment straps 54. To deploy the avalanche survival kit 10, the user reaches under the pull cord flap 34 and pulls on the "D" ring 24, which extends from the waist harness 20. Pulling the "D" ring 24 in turn pulls the pull cord 38. This force on the pull cord 28 opens the valve 40 and allows the compressed gas 44 to flow from the compressed gas canister 42 into the compressed gas line 46. The compressed gas 44 then flows into the airbag 28 and inflates it, so that it pushes off the pop off cover 36 and can be used to keep the user 12 above the surface of the avalanche 14, shown in FIG. 2. Additionally, when the avalanche survival kit 10 is deployed, the transmitter 22 is activated and sends out a transmission 26 to alert others of the location of the user 12. To deflate the airbag 28, the user opens the release valve 48 to allow the compressed gas 44 to escape.

FIG. 11 is a flow diagram of the avalanche survival kit 10 of the present invention. The steps shown herein instruct the user 12 how to setup the avalanche survival kit 10 with compressed gas 44 is step S114, and secure attach the avalanche survival kit 10 to their body beginning in step S100. In step S102, the user 12 inserts the right or the left arm into one of the shoulder straps. In step S104, the user 12 inserts the opposite arm into the other shoulder strap. Thereafter, in step S106, the user fastens the waist strap around their waist using the hook and loop strap to make sure the waist strap is secure. The user the adjusts the size of the first shoulder strap in step S108 followed by adjusting the opposite shoulder strap in step S110. Finally, the user in step S112 identifies the location of the deployment pull cord on the waist strap.

FIG. 12 is a flow diagram of the avalanche survival kit 10 of the present invention in use. In step S200, the user equips himself with the avalanche survival kit 10 in the manner described hereinabove with respect to FIG. 11. In step S202 the user, wearing the avalanche survival kit 10, proceeds with his sporting or work activities and is subjected to avalanche conditions as shown in step S204. In step S206, at least one of an avalanche occurs and the user expects that an avalanche is likely to occur. At this point, the user pulls on the "D" ring located on the waist strap as in step S208. Pulling the "D" ring causes two actions to occur simultaneously. First, in step S210, the the transmitter is activated and caused to emit a homing signal. Second, in step S212, the valve attached to the compressed gas filled canister is caused to move from a first closed position to a second open position. Thereafter, in step S214 the compressed gas is expelled from the canister and flows into the airbag for inflation thereof as in step S216. The airbag causes the cover removeably connected to the housing to be displaced therefrom as in step S218 and in step S220, the further increased mass of the airbag causes the airbag to be expelled from the housing. Upon being expelled from the housing in step S220, the released gas fills the airbag to create a body supporting apparatus that is able to stay on the surface of avalanching snow and/or sliding mud.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A apparatus for use in surviving at least one of an avalanche and a mudslide comprising:

a) a housing in the form of a back pack having a selectively inflatable member stored therein;

b) means comprising shoulder and waist straps connected to said housing for securing said housing to a user;

c) means connected to said selectively inflatable member for inflating said selectively inflatable member, wherein upon activation of said inflating means said selectively inflatable member is caused to inflate and be expelled from said housing forming a support for said user and stay on a surface of at least of avalanching snow and sliding mud;

d) said inflating means comprising a compressed gas canister, a gas line connecting said canister with said selectively inflatable member, a gas line valve connected between said canister and said gas line, and means for actuating said valve, wherein upon actuation of said valve, said valve is caused to move from a first closed position to a second open position allowing gas from said canister to flow through said gas line and into said selectively inflatable member for inflation thereof;

e) said actuating means comprising a pull cord extending from said waist strap through one of said shoulder straps to said valve, a D shaped ring positioned at the waist strap attached to an end of said pull cord, and a flap mounted on said waist strap covering said D shaped ring, whereby said user pulls said D shaped ring to deploy said inflatable member;

f) said back pack having a first side on a back of a user and a second side facing outwardly, an aperture in said second side, a removable cover over said aperture, said inflatable member being expelled through said aperture causing said cover to be displaced, said back pack having a top side with a pressure gauge mounted in said top side for monitoring pressure within said source of compressed gas;

g) a transmitter for emitting a signal including data representing a location of said user mounted in said back pack, said transmitter being connected to said inflating means and upon activation thereof causes said transmitter to emit said signal, said data including global positioning information to indicate a geographical location of said user, said transmitter being located on said top side of said back pack adjacent to said pressure gauge; and h) an intake valve located in said second side of said back pack adjacent said aperture for charging and discharging compressed air to and from said compressed gas canister through said gas line valve.

2. The apparatus as recited in claim 1, wherein said selectively inflatable member is tear-resistant.

* * * * *